Feb. 27, 1951        C. R. TAGGART        2,543,207
HOSE SUPPORTER

Filed July 31, 1946                                   2 Sheets-Sheet 1

INVENTOR.
Chester R. Taggart
BY
Wallace and Cannon
ATTORNEYS

Feb. 27, 1951 — C. R. TAGGART — 2,543,207
HOSE SUPPORTER
Filed July 31, 1946 — 2 Sheets-Sheet 2
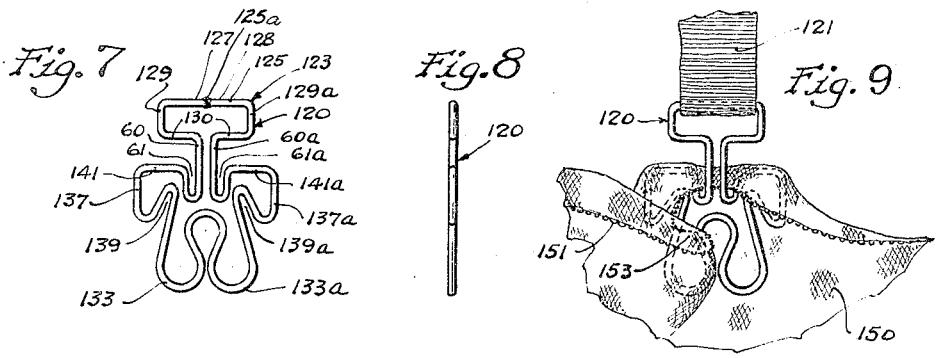
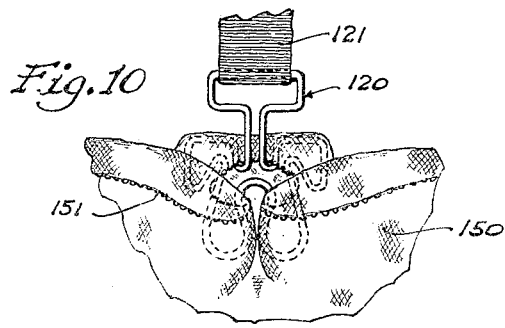
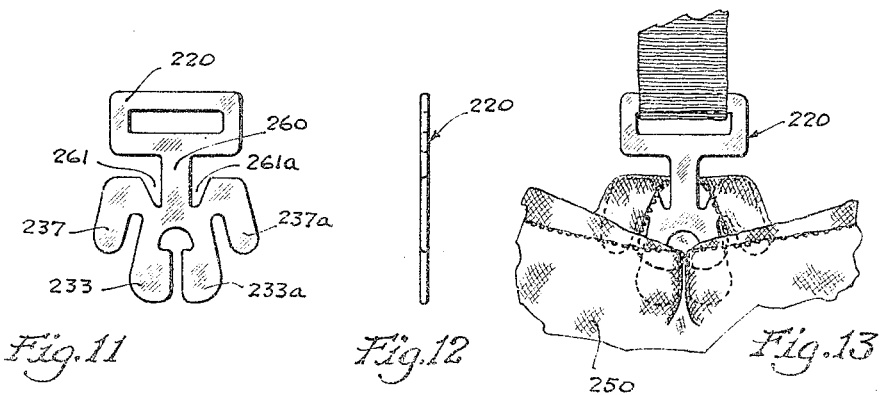
INVENTOR.
Chester R. Taggart
BY Wallace and Cannon
ATTORNEYS Patented Feb. 27, 1951

2,543,207

UNITED STATES PATENT OFFICE 2,543,207

HOSE SUPPORTER

Chester R. Taggart, Oak Park, Ill.

Application July 31, 1946, Serial No. 687,433

5 Claims. (Cl. 24—259)

This invention relates to supporters and more particularly to supporters of the type adapted to support hose in proper position on the wearer's leg.

Hose supporters are, in and of themselves, relatively old in the art; however, hose supporters heretofore known to the art have had certain inherent disadvantages such as, for example, being hard on stockings or that the attachment of them to the stockings was a relatively difficult or slow task. It is an object of my invention to construct a hose supporter that may be quickly and easily attached to a stocking and which is easy on the stocking, both during the operation of attaching it thereto and after it is so attached and is being used as a support therefor.

A further common disadvantage found among hose supporters heretofore known to the art has been that many of them were prone to slip or lose their grip on the stocking, especially when a heavy pull was exerted on the supporter. It is an object of my invention to construct a hose supporter which will support hose in a positive manner without slipping and wherein, when heavy pulls are exerted on the supporter, the supporter will not slip from the hose but will, instead, tighten its grip thereon.

Another common disadvantage found among hose supporters heretofore known to the art has been that the hose-gripping portion of many of them has been constructed of several separate elements pivotally or otherwise fastened together. Such construction had certain inherent disadvantages from both the operational and manufacturing point of view. The operational disadvantages included, among others, the fact that in connecting this type of supporter to hose it was necessary to properly fasten two or more separate elements together and if the elements were not fastened in the proper manner, they would injure the stocking or, as hereinbefore set forth, would slip. From the manufacturing point of view, of course, it is undesirable, where it can be avoided in a practical manner, to use two separate elements which must be fastened together and which, therefore, require an additional assembly operation. In this connection, it is a further object of my invention to overcome these objections and to provide a hose supporter which may be constructed in one piece.

Yet another object of my invention is to construct a hose supporter which may be commercially produced in an economical and relatively simple manner.

Another object of my invention is to construct a hose supporter which may be economically constructed in a practical manner from either wire or a suitable solid material such as, for example, a methyl methacrylate resin such as that commonly known in the trade as "Lucite."

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 7 is a front elevational view of a modified form of my hose supporter;

Fig. 8 is a side elevational view of the hose supporter shown in Fig. 7;

Fig. 9 is a view similar to Fig. 5 but showing a corresponding step in the operation of attaching the supporter shown in Figs. 7 and 8 to a stocking;

Fig. 10 is a view similar to Fig. 6 but is an illustration of the supporter shown in Figs. 7 and 8 in final attached position on a stocking;

Fig. 11 is a front elevational view of another modified form of my hose supporter;

Fig. 12 is a side elevational view of the hose supporter shown in Fig. 11; and

Fig. 13 is a view similar to Figs. 6 and 10 but showing the supporter shown in Figs. 11 and 12 in final attached position on a stocking.

Figure 1:
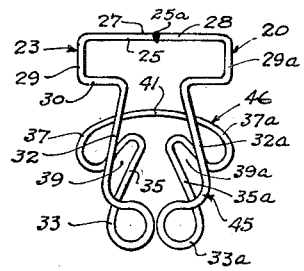
Fig. 1 is a front elevational view of a preferred form of my hose supporter.

In the drawings my invention is illustrated as embodied in a hose supporter 20, shown in Figs.

1 to 6, inclusive, is of the type adapted to be connected to a suitable supporting undergarment by the usual strap or webbing 21, the strap or webbing 21 being inserted through a channel-shaped attaching portion 23 on the supporter 20 and attached to an upper cross bar 25 thereof.

As best seen in Fig. 1, the hose supporter 20 is made of one piece of wire which is bent back and forth on itself and otherwise shaped to form a hose supporting member, as will be presently described in greater detail. I prefer to construct my hose supporter 20 from spring steel wire. However, I do not limit my invention thereto and other types of wire may be used without departing from the purview of my invention.

As best seen in Fig. 1, the ends of the wire from which my hose supporter is constructed terminate at approximately the center of the cross bar 25 and are suitably fastened together in any suitable manner, such as by soldering or welding 25a. Starting at either end of the wire 27 or 28, the wire extends horizontally to form one half of the cross bar 25 and then bends at substantially right angles thereto to form a vertical side wall 29 of the channel 23 and then bends substantially at right angles thereto to form a lower side wall 30 of the channel 23. Both ends of the lower side wall 30 terminate at the inner portions thereof in spaced relation to each other and the wire is bent and extends downwardly from the inner end portions of the side wall 30 to form a forward leg 32. From the lower end portion of the forward leg 32, the wire extends in a loop to form a tongue or gripping member 33 from which it extends under or to the rear of the forward leg 32 back upwardly toward the channel-shaped portion 23 to form a rear leg 35. From the rear leg 35 the wire doubles back upon itself and is then looped to form an ear 37. The ear 37 is spaced somewhat from the rear leg 35 so that a guide slot 39 is provided between the ear 37 and the rear leg 35 for purposes which will be described in greater detail hereinafter. From the ear 37 the wire extends substantially horizontally across in back of the forward leg 32 to form a lower cross bar 41 and terminates in a second ear 37a which is the reverse of, but otherwise identical to, the ear 37.

From the ear 37a to the other end 28 of the wire, the wire is bent in a reverse manner to that described with respect to the wire from the end 27 to the ear 37a, but is otherwise formed exactly the same and the parts formed in this portion of the wire, which are identical with elements formed in the other portion of the wire, bear the same reference numerals in the drawings with the suffix "a" added thereto.

From the foregoing description it will be apparent that my hose supporter is comprised of three major elements, namely, the channel-shaped attaching portion 23, a front stocking-engaging member 45, which includes the front legs 32 and 32a and the front portion of the tongues 33 and 33a, and a rear stocking-engaging member 46 which underlies the channel-shaped portion 23 and the front stocking-engaging member 45, and which includes the rear legs 35 and 35a, the ears 37 and 37a, the lower cross bar 41, and the rear portion of the tongues 33 and 33a, the front stocking-engaging member 45 and the rear stocking-engaging member 46 comprising a body member.

Figure 2:
Fig. 2 is a side elevational view of the hose supporter shown in Fig. 1.

The construction of the hose supporter shown in Figs. 1 and 2 now having been described, it is deemed advisable to describe a typical operation gone through in the attachment of my supporter to a stocking. An understanding of the operation described hereinafter will be facilitated by referring to Figs. 3, 4, 5 and 6, which illustrate successive steps in the attachment of my supporter to a stocking. References made to "left" and "right" in the following description refer to the left and right of the reader as the Figs. 3, 4, 5 and 6 are viewed.

Figure 3:
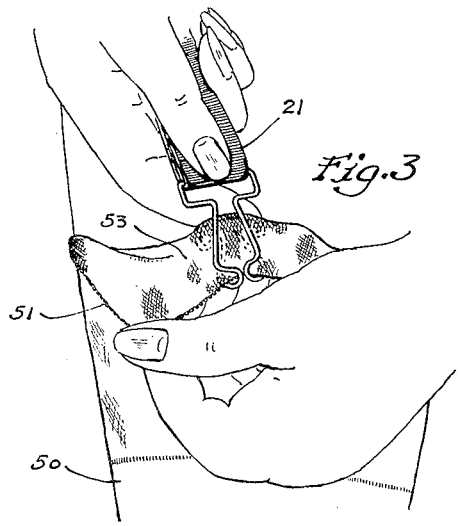
Fig. 3 is an illustration of one of the initial steps in the operation of attaching the supporter shown in Fig. 1 to a stocking.
Figure 4:
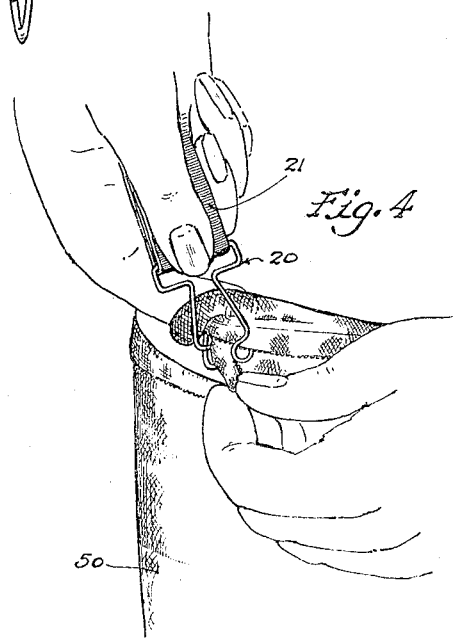
Fig. 4 is an illustration of a more advanced step in the operation shown in Fig. 3.

When my hose supporter is to be used to support a stocking it is attached to and supported by a suitable supporting undergarment or garter strap by a strap or webbing 21. The stocking 50 is first placed on the wearer's leg in the desired position with the upper edge or free edge 51 in normal upper position. The upper edge portion of the stocking to which the supporter 20 is to be attached is then folded down by the wearer forming a folded edge 53, as best seen in Fig. 3. The rear stocking-engaging member 46 is then slipped up behind the folded edge portion until the lower cross bar 41 of the stocking-engaging member 46 engages the inner or lower surface of the folded edge 53 of the stocking 50.

Figure 5:
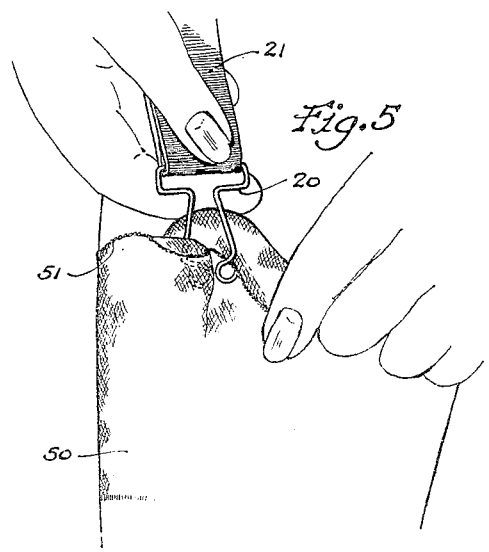
Fig. 5 is an illustration of a further advanced step in the operation of attaching my supporter to a stocking than that shown in Fig. 4.

The wearer then grasps, in one hand, the folded portion of the stocking 50 adjacent to the supporter 20, on the left side thereof, and holds the supporter 20 with the other hand. The wearer then pulls the grasped portion of the stocking firmly in an oblique direction down past the outer end of the ear 37 and pulls it tightly on down behind the tongue 33 and rear leg 35. When in this latter position this left portion of the stocking is stretched lightly from the outer lateral edge of the ear 37 down behind the tongue 33 and the rear leg 35, toward the lower or free end of the tongue 33, with the portion which the wearer is grasping in his or her fingers extending downward at an angle below the lower end or free end of the tongue 33, so that his fingers are below and slightly to the right of the tongue 33. The wearer then, while still maintaining the stocking tightly stretched between his fingers and the outer edge of the ear 37, pulls forwardly thereon so that the tightly stretched portion which extends below the tongue 33 bends forwardly at the lower edge of the tongue 33 and extends forwardly therefrom. The wearer then slides the tightly stretched portion of the stocking extending between his fingers and the lower edge of the ear 33 edgewise in an upward direction so that it enters the space between the tongue 33 and the tongue 33a and is gripped thereby. This left edge portion of the stocking is then released from the fingers of the wearer and the elasticity of the stocking pulls it upwardly at an angle across in front of the tongue 33 and the front leg 32, as is best seen in Fig. 5. To recapitulate, upon completion of this portion of the operation, this left upper edge portion of the stocking 50, as is best seen in Fig. 5, is so positioned that it is stretched tightly from the outer edge of the ear 37 down, at an angle, behind the tongue 33 and the rear leg 35 and then extends forwardly between the tongues or gripping members 33 and 33a and then lies back up at an angle across the front of the tongue 33 and the forward leg 32, where it is held by the elasticity of the stocking.

Figure 6:
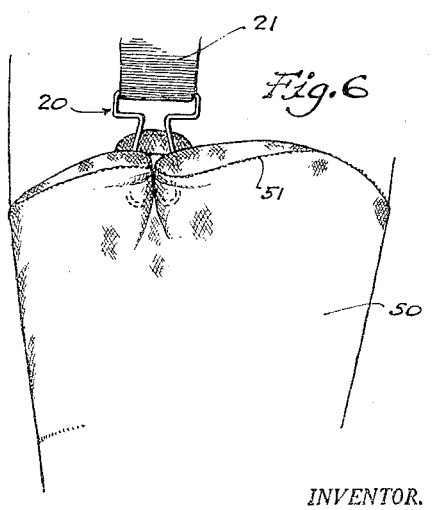
Fig. 6 is a view showing my hose supporter as it appears in final supporting engagement with a stocking.

The folded portion of the stocking 50 to the right of the supporter 20 is then grasped by the wearer (Fig. 5) and the looping operation just described with respect to the stocking portion to the left of the supporter 20 is repeated with this stocking portion; this time the stocking portion to the right of the supporter 20 being pulled firmly down, in an oblique direction, past the outer end of the ear 37a, and then tightly behind the tongue 33a and the rear leg 35a, and then firmly forwardly past the end of the tongue 33a, and the forwardly extending portion of the folded edge 53 of the stocking 50, which extends between the lower end of the tongue 33a and the wearer's fingers are then slid edgewise in an upward direction into position between the gripping members 33 and 33a and is gripped thereby. It will be seen that when this second described portion of the operation is completed, this right upper edge portion of the stocking 50, as is best seen in Fig. 6, is so positioned that it is stretched tightly from the outer edge of the ear 37a down, at an angle, behind the tongue 33a and the rear leg 35a and then extends forwardly between the tongues or gripping members 33 and 33a and then lies back up at an angle across the front of the tongue 33a and the forward leg 32a, where it is held by the elasticity of the stocking. Therefore, from the foregoing it will be seen that the upper edge portions of the stocking 50 adjacent to the left and right sides of the supporter 20 are each fastened to the supporter 20 in a manner which is the reverse to each other but is otherwise identical.

The hereinbefore described operation completes the attachment of the supporter 20 to the upper edge portion of the stocking 50 in supporting engagement therewith, and when the supporter 20 and the stocking 50 are so attached to each other they appear substantially as shown in Fig. 6.

It will be noted that when each of the portions to the left and right of the supporter 20 are pulled down across the respective ears 37 and 37a, and behind the respective tongues 33 or 33a, they are pulled so tightly that the portion so pulled causes that portion of the stocking which is adjacent to the respective guide slots 39 and 39a to be wedged back into the slot 39 or 39a, which, as will be presently described in greater detail, aids in securely fastening the supporter 20 to the stocking 51.

Also it will be seen that, as best illustrated in Fig. 6, when the stocking 50 and the holder 20 are fastened together in finally assembled position, a part of the folded edge portion 53 of the stocking 50 is pulled tightly across the lower cross bar 41 and the ears 37 and 37a. Therefore, it will be apparent that inasmuch as the upward pull on the supporter 20 is exerted on the center of the upper cross bar 25, between the forward legs 32 and 32a, and the downward pull of the stocking is exerted on the lower cross bar 41 and especially on the ends of the ears 37 and 37a, these opposing forces tend to flex the upper cross bar 25 and the lower cross bar 41 downwardly about their respective center points and thereby cause the rear legs 35 and 35a and the front legs 32 and 32a to be pivoted about these center points so that the tongues 33 and 33a carried by the ends of the front and rear legs are pressed firmly toward each other so as to firmly grip the stockings positioned therebetween.

Also it will be noted that the downward pull of the stocking on the outer end portions of the ears 37 and 37a causes the ears 37 and 37a to flex downwardly somewhat toward the rear leg portions 35 and 35a, respectively. This flexing of the ears 37 and 37a causes that portion of the stocking which, as has been previously discussed, is wedged into the guide slots 39 and 39a to be gripped therein between the ears 37 and 37a and the rear legs 35 and 35a, respectively.

Also it will be noted that the looping of the stocking around the tongues 33 and 33a has in and of itself somewhat of a snubbing action which further aids in securing the supporter 20 to the stocking 50 in a non-slip manner.

*Modification shown in Figs. 7 to 10*

A modified form of my invention is shown in Figs. 7 to 10, inclusive, in which parts similar to parts shown in Figs. 1 to 6, inclusive, bear the same reference numeral with the prefix "1" added thereto.

From the drawings it will be apparent that the principal difference between the modified form of hose supporter 120, shown in Figs. 7 to 10, inclusive, from the hose supporter 20 shown in Figs. 1 to 6, inclusive, is that the convolutions and shapes, into which the single strand of wire is bent to form the hose supporter 120, all lie in substantially the same plane rather than the two planes represented by the front stocking-engaging member 45 and the rear stocking-engaging member 46 of the hose supporter 20.

The ends 127 and 128 of the wire, from which the supporter 120 is formed, are fastened together by any suitable means such as welding or soldering 125a and the wire is bent and shaped to form a substantially channel-shaped attaching portion 123 having an upper cross bar 125, side walls 129 and 129a, and a bottom wall 130. The wire extends from the substantially channel-shaped attaching portion 123 downwardly to form center legs 60 and 60a and then doubles back upon itself to form slots 61 and 61a and then extends substantially perpendicular to the center legs 60 and 60a to form the inner cross bars 141 and 141a. From the cross bars 141 and 141a the wire is bent in convolutions to form ears 137 and 137a and then doubles back upon itself to form tongues 133 and 133a. The doubling back of the wire from the ears 137 and 137a to form the tongues 133 and 133a forms guide slots 139 and 139a, respectively.

It will be seen that inasmuch as the modified form of my invention, illustrated in Figs. 7 to 10, inclusive, does not include separate front and rear stocking-engaging portions such as those shown in Figs. 1 and 2 of the previously discussed form of my invention, the operation of attaching the hose supporter shown in Figs. 7 and 8 is somewhat different than the operation heretofore discussed with respect to the hose supporter shown in Figs. 1 and 2. However, the operations are sufficiently the same that it is felt that only two steps in the operation of attaching the hose supporter 120 to a stocking need be illustrated and that these two steps, taken in conjunction with the following description of this operation, will clearly show how such an operation is accomplished.

As previously set forth with respect to the hose supporter shown in Figs. 1 and 2, when my hose supporter 120, shown in Figs. 7 and 8, is to be used to support a stocking it is attached to a suitable supporting undergarment or garter by the usual belt or webbing 121 and the stocking 150 is placed on the leg of the wearer in the desired position.

The upper end portion of the stocking is then folded downwardly in the manner set forth with respect to the attachment of a form of my invention shown in Figs. 1 and 2, and a portion or free edge 151 of the stocking, which has been folded down, is then inserted into the slots 61 and 61a in the supporter 120 in such a manner that the free edge portion of the stocking lies behind the central legs 60a and 61a and lies in front of the upper end portion of the ears 137 and 137a, as is best seen in Fig. 9.

The wearer then grasps in one hand the folded portion of the stocking 150 adjacent to the left side of the supporter 120 and, holding the supporter 20 with the other hand, then pulls the grasped portion of the stocking firmly in an oblique direction down past the outer end portion of the ear 137 and pulls it tightly on down behind the tongue 133 and then pulls it firmly forwardly around the lower end or free end of the tongue 133 and slides the folded edge 153 of the stocking 151 edgewise upwardly into position between the tongues or gripping members 133 and 133a. This left edge portion of the stocking is then released from the hand of the wearer and the elasticity of the stocking pulls it upwardly at an angle across in front of the tongue 133, as is best seen in Fig. 9.

The folded portion of the stocking 150 to the right of the supporter 120 is then grasped by the wearer (Fig. 9) and the operation hereinbefore described with respect to the stocking portion to the left is repeated wtih this stocking portion; this time the stocking portion to the right of the supporter 120 is pulled firmly in an oblique direction, down past the outer end portion of the ear 137a, and then tightly on down behind the tongue 133a, and then firmly forwardly around the lower end or free end of the tongue 133a, and the folded edge 153 of the stocking 150 is then slid edgewise into position between the gripping members 133 and 133a. This right edge portion of the stocking is then released from the hand of the wearer and the elasticity of the stocking pulls it upwardly at an angle across in front of the tongue 133, as is best seen in Fig. 10.

The hereinbefore described operation completes the attachment of the supporter 120 to the upper edge portion of the stocking 150 in supporting engagement therewith, and when the supporter 120 and the stocking 150 are so attached to each other they appear substantially as shown in Fig. 10.

It will be noted that when the stocking 150 is attached to the supporter 120 in finally secured manner (Fig. 10) a part of the folded edge 153 of the stocking 150 is pulled tightly down on the cross bars 141 and 141a and the ears 137 and 137a in a manner similar to that shown in Fig. 6, so that the pull exerted by the webbing 121 on the substantially channel-shaped portion 123 and the downward pull of the stocking 150 on the cross bars 141 and 141a and the ears 137 and 137a tends to flex the tongues 133 and 133a inwardly toward each other to thereby firmly grip that portion of the stocking 150 which extends therebetween.

Also it will be seen that the downward force exerted on the outer end portions of the ears 137 and 137a tends to press the ears 137 and 137a toward the tongues 133 and 133a, respectively, so that the portions of the stocking which extend through the slots 139 and 139a are gripped between the ears 137 and 137a and the tongues 133 and 133a.

Also it will be seen that, similarly to the form of the invention shown in Figs. 1 and 2, the looping of the stocking 150 around the tongues 133 and 133a has somewhat of a snubbing effect which aids in attaching the holder 120 to the stocking 150 in a non-slip manner.

*Modification shown in Figs. 11, 12 and 13*

The modified form of my hose supporter illustrated in Figs. 11 to 13, inclusive, is identical with that shown in Figs. 7 to 10, inclusive, the only difference being that Figs. 11 to 13 illustrate my hose supported as it would appear when constructed of a plastic, such as, for example, a methyl methacrylate resin such as that commonly known in the trade as "Lucite," or other suitable solid material as distinguished from wire from which the form shown in Figs. 7 to 10, inclusive, is constructed.

The elements shown in Figs. 11 to 13 which are identical with the elements shown in Figs. 7 to 10 bear the same reference numeral with the exception that the prefix "1" used in Figs. 7 to 10 is changed to the prefix "2."

In the operation of attaching the modified form of my hose supporter 220 to the hose 250, the upper end portion of the hose 250 is also folded down and inserted into the slots 261 and 261a so as to lie behind the center leg 260 and lie in front of the upper end portion of the ears 237 and 237a of the supporter 220. The upper edge portion of the stocking adjacent to the left and right side of the hose supporter 220 is then pulled down past the respective ear 237 or 237a, and down behind and up over the tongue 233 or 233a in the manner heretofore set forth with respect to the modification shown in Figs. 7 to 10, inclusive, the final attachment of the supporter 220 to the stocking 250 (as shown in Fig. 13) being identical with the final attachment of the supporter 120 to the stocking 150, as shown in Fig. 10.

From the foregoing it will be apparent that I have constructed a novel hose supporter which may be quickly and easily attached to a stocking and which, when so attached, securely holds the stocking in a manner which insures that it will not slip.

Further, it will be apparent that I have provided a stocking supporter which, because of the flexing of the supporter and because of the manner in which the stocking is positioned thereon, tends to grip the stocking supported thereby more firmly, rather than tending to slip therefrom, when excessive pulls are exerted thereon.

Also it will be apparent that I have provided a novel and practical hose supporter which may be economically produced commercially by either a simple wire bending operation or a stamping or molding operation.

Also it will be noted that the present invention accomplishes its intended objects, some of which have been specifically referred to hereinbefore and others of which will be apparent from the foregoing description taken in conjunction with the accompanying drawings.

I claim:

1. A hose supporter comprising a substantially channel-shaped attaching member, a pair of front legs depending from said member, a pair of upwardly extending rear legs underlying said front legs, means interconnecting the upper end portion of said rear legs, and means connecting the lower end portion of each of said front legs to the lower end portion of a corresponding one of the said rear legs, each of said rear legs being disposed along to said means interconnecting the upper end portion of said rear legs in spaced relation thereto to provide an outwardly and downwardly opening guide slot therebetween, 2. A one-piece supporter for stockings and the like and comprising an elongated front stocking-engaging member having a top end and a bottom end and comprising an elongated cross-bar at the top end thereof, and two elongated legs depending from respective opposite ends of said cross-bar, said two legs having lower end portions disposed closely adjacent each other for clampingly engaging portions of such stockings, and an elongated rear stocking-engaging member underlying said front member and interconnecting said two legs, said rear member comprising two other elongated legs mounted on and projecting upwardly from said lower ends of respective ones of said first mentioned legs, and an elongated cross-bar mounted on the upper ends of said other elongated legs, each of said other elongated legs having a central portion projecting inwardly toward said other of said elongated legs to thereby form an outwardly opening slot in each of said other legs for receiving a portion of such a stocking therein.

3. A one-piece supporter for stockings and the like and comprising a transversely extending supporting member, and an elongated body member mounted at one end to said supporting member and depending therefrom for operatively engaging a stocking to be supported, said body member comprising two ears projecting laterally from respective sides of the upper end portion of said body member, and two downwardly projecting tongues comprising the lower end portion of said body member, said tongues being disposed closely adjacent each other for gripping a portion of a stocking when said portion of said stocking is disposed between them, and each of said ears being positioned closely adjacent and relative to a respective one of said tongues to form an outwardly and downwardly opening slot in said body member between a portion of said ear and a portion of said respective tongue for receiving other portions of such a stocking.

4. The supporter defined in claim 3 and in which said body member is substantially flat and comprises a wire member tortiously bent to form said ears and said tongues.

5. The supporter defined in claim 3 and in which said body member comprises a substantially flat member of sheet material.

CHESTER R. TAGGART.

REFERENCES CITED

The following references are of record in the file of this patent:

UNITED STATES PATENTS

| Number | Name | Date |
|---|---|---|
| 367,492 | Ziegler | Aug. 2, 1887 |
| 535,749 | Bellis | Mar. 12, 1895 |
| 557,456 | Utter | Mar. 31, 1896 |
| 649,338 | McGill | May 8, 1900 |
| 742,150 | Bedworth | Oct. 27, 1903 |
| 784,500 | Palmer | Mar. 7, 1905 |
| 1,082,005 | Bellis | Dec. 23, 1913 |
| 1,129,388 | Guerrant | Feb. 23, 1915 |
| 1,148,847 | MacKenzie | Aug. 3, 1915 |
| 1,247,373 | Chaney | Nov. 20, 1917 |
| 1,330,968 | Woods | Feb. 17, 1920 |
| 1,449,925 | Wilson | Mar. 27, 1923 |
| 2,269,696 | Shaulson | Jan. 13, 1942 |